United States Patent
Holthuizen et al.

(10) Patent No.: US 10,339,710 B2
(45) Date of Patent: Jul. 2, 2019

(54) MEDICAL IMAGE SYSTEM AND METHOD (75) Inventors: Ronaldus Frederik Johannes Holthuizen, Best (NL); Johan Michiel Den Harder, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 742 days.

(21) Appl. No.: 14/114,997

(22) PCT Filed: Apr. 26, 2012

(86) PCT No.: PCT/IB2012/052094
§ 371 (c)(1),
(2), (4) Date: Oct. 31, 2013

(87) PCT Pub. No.: WO2012/153222
PCT Pub. Date: Nov. 15, 2012

(65) Prior Publication Data
US 2014/0055456 A1 Feb. 27, 2014

(30) Foreign Application Priority Data
May 6, 2011 (EP) .................................... 11165156

(51) Int. Cl.
G06T 19/00 (2011.01)

(52) U.S. Cl.
CPC ............ G06T 19/003 (2013.01); G06T 19/00 (2013.01); *G06T 2210/41* (2013.01); *G06T 2219/028* (2013.01)

(58) Field of Classification Search
None
See application file for complete search history.

(56) References Cited

U.S. PATENT DOCUMENTS

| 5,734,384 A | 3/1998 | Yanof |
| 6,838,879 B2 | 1/2005 | Kouwenhoven |

(Continued)

FOREIGN PATENT DOCUMENTS

WO 2008089483 A2 7/2008

OTHER PUBLICATIONS

Wojciech Matusik, Chris Buehler, Ramesh Raskar, Steven J. Gortler, Leonard McMillan, "Image-Based Visual Hulls", 2000, ACM, SIGGRAPH '00 Proceedings of the 27th annual conference on Computer graphics and interactive techniques pp. 369-374.*

(Continued)

*Primary Examiner* — Robert Bader (57) ABSTRACT

A medical image system (100) for enables a user to navigate through three-dimensional 3D image data showing an anatomical structure by simultaneously displaying a set of views of the 3D image data showing the anatomical structure. The system includes a data input (140) for receiving orientation data (142), a user input (120) for receiving a navigation command (122) from the user, a plane processor (160) for, in dependence on the navigation command, adjusting a spatial configuration of a set of planes (102) for obtaining a further set of planes (162) intersecting the 3D image data, and a view processor (180) for, in dependence on the further set of planes and the orientation data, establishing a further set of views (182) of the 3D image data for displaying the further set of views as an update of the set of views.

15 Claims, 6 Drawing Sheets

(56) References Cited

U.S. PATENT DOCUMENTS

| | | |
|---|---|---|
| 6,888,546 B1 | 5/2005 | Kim |
| 7,061,484 B2 | 6/2006 | Balley |
| 7,889,194 B2 | 2/2011 | Engel |
| 2005/0113664 A1* | 5/2005 | Stefani .................. A61B 6/032 600/407 |
| 2006/0126920 A1 | 6/2006 | Rust |
| 2006/0291717 A1 | 12/2006 | Mussack et al. |
| 2007/0229500 A1 | 10/2007 | Engel |

OTHER PUBLICATIONS

Lisa Lindfors, Hanna Lindmark, "Graphical User Interfaces for Volume Rendering Applications in Medical Imaging", 2002, Linköping University, Department of Science and Technology, Student Thesis.*

Ney, Derek et al "Interactive Multidimensional Display of Magnetic Resonance Imagng Data", Journal of Digital Imaging, vol. 3, No. 4, Nov. 1990, pp. 254-260.

Robb, Richard A. "Three-Dimensional Visualization in Medicine and Biology", Handbook of Medical Imaging, Sep. 2000, pp. 685-712.

Tory, Melanie et al "VisualizationTask Performance with 2D, 3D, and Combination Displays", IEEE Transactions on Visualization and Computer Graphics, vol. 12, No. 1, Jan. 2006.

Kellman, Peter et al "Automatic In-Plane Rotation for Doubly-Oblique Cardiac Imaging", Journal of Magnetic Resonance Imaging, vol. 18, 2003, pp. 612-615.

* cited by examiner

MEDICAL IMAGE SYSTEM AND METHOD

CROSS-REFERENCE TO PRIOR APPLICATIONS

This application is the U.S. National Phase application under 35 U.S.C. § 371 of International Application No. PCT/IB2012/052094, filed on Apr. 26, 2012, which claims the benefit of European Patent Application No.11165156.8, filed on May 6, 2011. These applications are hereby incorporated by reference herein.

FIELD OF THE INVENTION

The invention relates to a medical image system for, and a method of displaying a set of views of three-dimensional (3D) image data. The invention further relates to a workstation and imaging apparatus comprising the medical image system, and a computer program product for causing a processor system to perform the method.

In the fields of medical image viewing and medical image acquisition, various systems and methods exist for enabling a user to navigate through 3D image data. For example, a workstation may enable a clinician to navigate through 3D image data by receiving move, pan or zoom navigation commands from the clinician, and showing views of the 3D image data in response to the navigation commands. Such views may be generated by, e.g., multi-planar reformatting (MPR) or maximum intensity projection (MIP) techniques, as are known from the technical field of 3D image data visualization. The views are typically two-dimensional (2D) views, but may equally be 3D views of the 3D image data.

The workstation may simultaneously show a set of views of the 3D image data. For example, a first view may show an intersection of an anatomical structure along a transverse plane, a second view may show an intersection of the anatomical structure along a coronal plane, and a third view may show an intersection of the anatomical structure along a sagittal plane. Here, transverse, coronal and sagittal refer to orientations of the respective planes with respect to an orientation of a patient. Such pre-defined orientations are known from the field of medical imaging. The clinician may therefore simultaneously obtain multiple views of the anatomical structure when navigating through the 3D image data.

BACKGROUND OF THE INVENTION

While navigating through the 3D image data, the clinician may obtain views that do not correspond to said predefined orientations. For example, a view may correspond to an intersection plane of the anatomical structure that is rotated with respect to the transverse plane towards the coronal and sagittal planes about an axis defined by an intersection of the coronal and sagittal plane. The resulting rotated intersection plane may be referred to as an oblique plane, and the view may be referred to as an oblique view. The intersection plane may be further tilted towards, e.g., the sagittal plane about an axis defined by the oblique plane and the sagittal plane. The resulting intersection plane may be referred to as a double-oblique plane, and the view may be referred to as a double-oblique view.

A book "Magnetic Resonance Tomography", edited by Maximilian F. Reiser et al., Springer Publisher, 1st edition, 15 Nov. 2007, discusses on page 1451 a labeling of four sides of an image, with the labeling indicating whether the image is a basic orientation image, i.e., corresponding to a transverse, coronal or sagittal view, an oblique image, or a double oblique image. It is said that this helps clarify the anatomical orientation of the image. Moreover, it is said that the displayed image may have a further, in-plane, rotation, which should be indicated as either an angle of rotation or with a graphical icon.

SUMMARY OF THE INVENTION

A problem of the abovementioned measures is that these are insufficiently suitable for allowing a clinician to intuitively navigate through 3D image data.

It would be advantageous to have a medical image system or method for allowing a clinician to more intuitively navigate through 3D image data.

To address this concern, a first aspect of the invention provides a medical image system for enabling a user to navigate through three-dimensional [3D] image data showing an anatomical structure by simultaneously displaying a set of views of the 3D image data showing the anatomical structure, the set of views being defined by an associated set of respective planes intersecting the 3D image data, the set of planes having a spatial configuration in the 3D image data, and the system comprising a data input for receiving orientation data being indicative of a reference orientation of the anatomical structure in a reference view, the reference view being defined by a reference plane intersecting the 3D image data, a user input for receiving a navigation command from the user, a plane processor for, in dependence on the navigation command, adjusting the spatial configuration of the set of planes for obtaining a further set of planes intersecting the 3D image data, a view processor for, in dependence on the further set of planes, establishing a further set of views of the 3D image data for displaying the further set of views as an update of the set of views, and the view processor being arranged for establishing at least a first view of the further set of views by (i) determining a spatial difference between, on the one hand, a first plane of the further set of planes being associated with the first view, and on the other hand, the reference plane, and (ii) adjusting a rotation of the first view in the first plane in dependence on the spatial difference for more aligning an anatomical orientation of the anatomical structure in the first view to the reference orientation in the reference view.

In a further aspect of the invention, a workstation or imaging apparatus is provided comprising the medical image system set forth.

In a further aspect of the invention, a method is provided for enabling a user to navigate through three-dimensional [3D] image data showing an anatomical structure by simultaneously displaying a set of views of the 3D image data showing the anatomical structure, the set of views being defined by an associated set of respective planes intersecting the 3D image data, the set of planes having a spatial configuration in the 3D image data, and the method comprising receiving orientation data being indicative of a reference orientation of the anatomical structure in a reference view, the reference view being defined by a reference plane intersecting the 3D image data, receiving a navigation command from the user, adjusting, in dependence on the navigation command, the spatial configuration of the set of planes for obtaining a further set of planes intersecting the 3D image data, establishing, in dependence on the further set of planes, a further set of views of the 3D image data for displaying the further set of views as an update of the set of views, and establishing at least a first view of the further set of views by (i) determining a spatial difference between, on the one hand, a first plane of the further set of planes being associated with the first view, and on the other hand, the reference plane, and (ii) adjusting a rotation of the first view in the first plane in dependence on the spatial difference for more aligning an anatomical orientation of the anatomical structure in the first view to the reference orientation in the reference view.

In a further aspect of the invention, a computer program product is provided comprising instructions for causing a processor system to perform the method set forth.

The aforementioned measures enable a user to navigate through image data having at least three dimensions. For that purpose, the medical image system simultaneously displays a set of views of the 3D image data. A view is a representation of at least a portion of the 3D image data. By displaying a set of views, multiple of these representations are provided to the user. The set of views may be displayed on, e.g., a display that is part of the medical image system, or on an external display. The set of views is defined by an associated set of planes intersecting the 3D data. Thus, each view of the set of views is clearly characterized by an associated one of the set of planes, with said plane intersecting the 3D image data. The set of planes has a spatial configuration in the 3D image data, denoting an orientation and/or position of each one of the set of planes with respect to, e.g., a reference point or with respect to the orientation and/or position of the others of the set of planes.

The 3D image data is a representation of an anatomical structure such as an organ, e.g., a heart, or a patient's entire body, thus in itself comprising further anatomical sub-structures. The set of views provides multiple representations of the anatomical structure.

The medical image system comprises a data input for receiving orientation data. The orientation data provides the medical image system with information on a reference orientation of the anatomical structure in a reference view. The reference orientation indicates how the anatomical structure is oriented within the reference view. The reference view may be a clinically established reference view of the anatomical structure, e.g., a radiological view, which is easily interpreted by a clinician or radiologist. The reference orientation may be a clinically established orientation of the anatomical structure in the reference view, and may, for example, indicate that an anterior of a patient's body is oriented to a top of the reference view and a lateral left of the patient's body is oriented to a right of said view. The reference view is defined by a reference plane intersecting the 3D image data.

The medical image system further comprises a user input for receiving a navigation command from the user. As such, the user may use a user input device such as, e.g., a mouse, keyboard, touch-sensitive surface, etc. that is connected to the user input for providing the navigation command. In general, the medical image system uses the navigation commands for enabling the user to navigate through the 3D image data.

The medical image system further comprises a plane processor. The plane processor receives the navigation command from the user input and uses the navigation command to adjust the spatial configuration of the set of planes within the 3D image data. As such, the orientation and/or position of at least one of the set of planes is modified. As a result, a further set of planes is obtained that also intersects the 3D image data.

The medical image system further comprises a view processor. The view processor receives information on the further set of planes from the plane processor and uses said information to establish a further set of views of the 3D image data. As a result of the orientation and/or position of at least one of the set of planes being modified, at least one of the further set of views differs from a corresponding view of the set of views. The medical image system uses the further set of views as an update of the set of views in response to the navigation command, thereby enabling the user to navigate through 3D image data.

The view processor is arranged for establishing at least a first view of the further set of views by performing the following. Firstly, a spatial difference is determined between, on the one hand, a plane from the further set of planes by which the first view is defined, and on the other hand, the reference plane. The spatial difference is indicative of a difference in orientation and/or position between the two planes. Then, the spatial difference is used to adjust a rotation of the first view in the first plane, thereby performing a so-termed in-plane rotation. The rotation may be around a center of rotation, which may be defined by, e.g., a common intersection point of the set of planes. As a consequence, when displaying the first view on a display at a fixed view orientation and position, the rotation of the first view in the first plane results in a content of the view being rotated. The view processor is arranged for rotating the first view for more aligning an anatomical orientation of the anatomical structure in the first view to the reference orientation in the reference view. Thus, the first view is established with the anatomical orientation being more aligned to the reference orientation with respect to a comparable, yet non-adjusted first view.

The measures according to the invention have the effect that the system responds to the user providing a navigation command by displaying a further set of views, with at least one of said views being adjusted for more aligning an anatomical orientation of an anatomical structure shown in the view to a reference orientation of the anatomical structure in a reference view. Thus, when, as a result of the user freely navigating through the 3D image data, the first view does not correspond to the reference view, the user is nevertheless provided with an orientation of the anatomical structure that is more aligned to the reference orientation of the anatomical structure than would otherwise be the case.

The invention is partially based on the recognition that a clinician may be most familiar with an anatomical structure being shown in a reference view in which the anatomical structure has a reference orientation. For example, when viewing 3D image data of a patient's body, the clinician may be familiar with a coronal view of the body, in which the body is shown with a head to the top of the view and a lateral left of the body to the right of the view. The coronal view may be defined by a coronal plane that divides the body into ventral and dorsal sections. Similarly, the clinician may be familiar with so-termed transverse and sagittal views, defined by a transverse plane and sagittal plane, respectively.

At the same time, it may be desirable for the clinician to obtain views of the patient's body that are different from the reference views, e.g., for more closely inspecting a particular anatomical sub-structure. Thus, it may be desirable to freely navigate through the 3D image data. However, as a result, the clinician may be less familiar, or confused, by the views obtained by freely navigating through the 3D image data. The measures of the invention have the effect that the views, e.g., in the form of a series of first views, are rotated to more align the anatomical orientation of the anatomical structure in those views to a reference orientation in a reference view. Advantageously, the views are presented to a clinician in a manner that is more similar to the reference view. Advantageously, oblique view and double-oblique views may be less confusing for a clinician. Advantageously, a clinician may freely navigate through 3D image data without needing to manually adjust the navigation to maintain the anatomical structure at the reference orientation. Advantageously, adjusting a rotation of the first view in the first plane does not affect the spatial configuration of the further set of planes nor the other views of the further set of views.

Optionally, the view processor is arranged for adjusting the rotation of the first view in the first plane for fully aligning the anatomical orientation of the anatomical structure to the reference orientation.

The anatomical structure is thus shown in the first view at an orientation that is fully aligned to the reference orientation of the anatomical structure in the reference view. Advantageously, the medical image system provides a clinician with views in which the anatomical structure is presented in a manner that is most similar to the reference view.

Optionally, the view processor is further arranged for mirroring the first view with respect to a mirror axis in the first plane for said more aligning the anatomical orientation of the anatomical structure with the reference orientation.

The first view may be orientated and/or positioned in the 3D image data in a manner in which mirroring may provide a further aligning the anatomical orientation of the anatomical structure with the reference orientation than solely rotating the first view in the first plane. For example, a sagittal orientation of a body in a sagittal view may show the body's abdomen towards the left of the reference view and the head towards the top of the reference view. A first view may initially show the body's abdomen towards the right of the first view and the head towards the top of the first view. Hence, mirroring the first view in the first plane with respect to a mirror axis running from the patient's head towards his feet axis may enable a further aligning of the anatomical orientation of the body in the first view than solely rotating the first view would have allowed. Advantageously, the alignment of the anatomical orientation to the reference orientation is further improved.

Optionally, the set of views and the further set of views each comprise three views for simultaneously showing three portions of the anatomical structure. Displaying three views of 3D image data is well suited for showing the anatomical structure to a user when navigating through the 3D image data.

Optionally, the set of planes is a mutually orthogonal set of planes, and the plane processor is arranged for providing as the further set of planes a mutually orthogonal further set of planes.

The plane processor thus provides a mutually orthogonal further set of planes in response to the navigation command. A mutually orthogonal further set of planes results in the view processor establishing a mutually orthogonal further set of views, with the mutually orthogonal further set of views being well suited for showing the anatomical structure to a user when navigating through the 3D image data.

Optionally, the reference plane is defined by two coordinate axes of the 3D image data. The reference plane thus coincides with, or runs in parallel to a plane of the coordinate system of the 3D image data. Such planes frequently intersect the anatomical structure in a manner in which the thereto corresponding view shows a clinically established reference orientation of the anatomical structure.

Optionally, the anatomical structure is a body of a patient, and the reference plane is one of the group of: a transverse plane, a coronal plane, and a sagittal plane, intersecting the body. Transverse, coronal and sagittal intersections of the body of a patient are clinically established intersections of the body. Here, the coronal plane is any vertical plane that divides the body into ventral and dorsal sections, the sagittal plane is a vertical plane which passes from front to rear dividing the body into right and left sections. The transverse plane, also referred to as horizontal plane, axial plane, or transaxial plane, is a horizontal plane that divides the body into superior and inferior parts. It is perpendicular to the coronal and sagittal planes. Here, vertical refers to a plane running in parallel to a length of the body, and horizontal to a plane running orthogonal, i.e., intersecting, the length of the body.

Optionally, the reference orientation is one of the group of: a transverse orientation, a coronal orientation, and a sagittal orientation, of the body. The transverse, coronal and sagittal orientations of the body are orientations that are well established within the technical field of medical imaging. Here, transverse orientation refers to an orientation of the body in a view defined by a transverse plane, i.e., a transverse view, in which the anterior side is oriented towards a top of the view and the left side of the body to the right side of the view. Sagittal orientation refers an orientation of the body in a view defined by a sagittal plane, i.e., a sagittal view, in which the head is oriented to a top of the view and the anterior side to the left. Coronal orientation refers to an orientation of the body in a view defined by a coronal plane, i.e., a coronal view, in which the head is oriented to a top of the view and the left side of the body to the right side of the view.

Optionally, the anatomical structure is a heart, and the reference plane is one of the group of: a vertical long axis plane, a two chamber view plane, a horizontal long axis plane, and a four chamber view plane, intersecting the heart. Said intersections of the heart are of particular clinically relevance to a clinician.

Optionally, the view processor is configured for determining the spatial difference by (i) determining a first normal vector of the first plane, (ii) determining a reference normal vector of the reference plane, and (iii) comparing the first normal vector with the reference normal vector.

The first normal vector is indicative of an orientation of the first plane. The reference normal vector is indicative of an orientation of the reference plane. By comparing the first normal vector with the reference vector, a difference in spatial orientation, i.e., a spatial difference, can be determined between the first plane and the reference plane. Said manner of determining the spatial difference is efficient.

Optionally, the orientation data is indicative of a plurality of reference orientations of the anatomical structure with respect to a plurality of reference planes intersecting the 3D image data, and the view processor is arranged for (i) determining a plurality of spatial differences between, on the one hand, the first plane of the further set of planes being associated with the first view, and on the other hand, a respective one of the plurality of reference planes, (ii) selecting one of the plurality of reference orientations in dependence on the plurality of spatial differences, and (iii) adjusting the rotation of the first view for more aligning the anatomical orientation of the anatomical structure with the selected one of the plurality of reference orientations.

Thus, a plurality of reference orientations is provided, and the view processor is arranged for selecting one of the plurality of reference orientations in dependence on the plurality of spatial differences. Advantageously, the view processor is arranged for selecting the one of the plurality of reference orientations that is associated with a reference plane that is spatially most similar to the first plane. As a result, the view processor automatically aligns the anatomical structure to a reference orientation of a reference view being defined by a spatially most similar reference plane. Thus, during navigation, the anatomical orientation will be automatically aligned to a reference orientation of a reference view having a spatially most similar reference plane.

It will be appreciated by those skilled in the art that two or more of the above-mentioned options, implementations, and/or aspects of the invention may be combined in any way deemed useful.

Modifications and variations of the imaging apparatus, the workstation, the method, and/or the computer program product, which correspond to the described modifications and variations of the medical image system, can be carried out by a person skilled in the art on the basis of the present description.

A person skilled in the art will appreciate that the method may be applied to multi-dimensional image data, e.g. to two-dimensional (2-D), three-dimensional (3-D) or four-dimensional (4-D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM). A dimension of the multi-dimensional image data may relate to time. For example, a four-dimensional image may comprise a time domain series of three-dimensional images.

The invention is defined in the independent claims. Advantageous embodiments are defined in the dependent claims.

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

Figure 1:
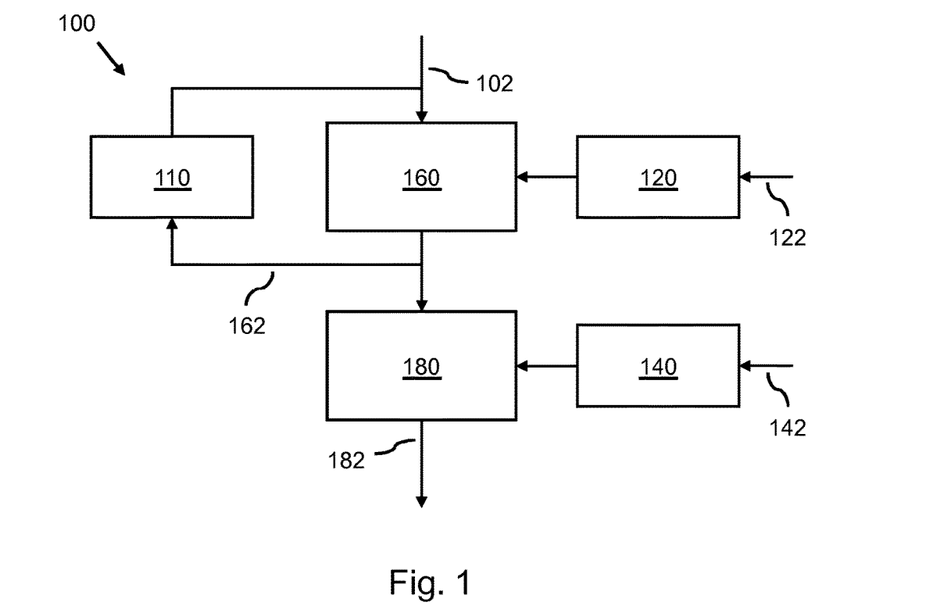
FIG. 1 shows a medical image system according to the invention.

FIG. 1 shows a medical image system 100 for enabling a user to navigate through three-dimensional image data showing an anatomical structure by simultaneously displaying a set of views of the 3D image data showing the anatomical structure. For that purpose, the medical image system 100 may be connected to a display, or, although not shown in FIG. 1, may comprise the display. The set of views is defined by an associated set of respective planes 102 intersecting the 3D image data, the set of planes 102 having a spatial configuration in the 3D image data. The medical image system 100 comprises a data input 140 for receiving orientation data 142 being indicative of a reference orientation of the anatomical structure in a reference view, the reference view being defined by a reference plane intersecting the 3D image data. The orientation data 142 may be encoded in any suitable data representation. The medical image system 100 further comprises a user input 120 for receiving a navigation command 122 from the user. Although not shown in FIG. 1, the user may provide the navigation command 122 to the user input 120 by means of a user input device such as, e.g., a mouse, a keyboard or a touch-screen surface.

The medical image system 100 further comprises a plane processor 160 for, in dependence on the navigation command 122, adjusting the spatial configuration of the set of planes 102 for obtaining a further set of planes 162 intersecting the 3D image data. For receiving the navigation command 122, the plane processor 160 is shown to be connected to the user input 120. The medical image system 100 further comprises a view processor 180 for, in dependence on the further set of planes 162, establishing a further set of views 182 of the 3D image data for displaying the further set of views 182. Although not shown in FIG. 1, the view processor 180 may provide the further set of views 182 to the display, where the further set of views 182 is displayed as an update of the set of views.

The medical image system 100 may, as shown in FIG. 1, comprise a buffer memory 110 that receives and subsequently buffers the further set of planes 162. For receiving the further set of planes 162, the buffer memory 110 is shown to be connected to the plane processor 160. During a continued operation of the medical system 100, the user may provide a further navigation command. The plane processor 160 may then, in dependence on the further navigation command, iteratively adjust the spatial configuration of a set of planes by receiving the set of planes from the buffer memory 110, adjusting its spatial configuration, and storing the result in the buffer memory 110 for use in a next iteration.

It is noted that the term 3D image data is understood as referring to any suitable type of 3D image data, such as volumetric 3D image data or 3D image data formed by a stack of 2D images, i.e., a stack of so-termed 2D image slices. The 3D image data may have been obtained through, e.g., Magnetic Resonance Imaging (MRI), X-ray Imaging, Computed Tomography (CT), or any other suitable medical image acquisition modality.

Moreover, the term view refers to a representation of at least a portion of the 3D image data. The representation may be in the form of a 2D image or a 3D image. The latter may be for display on a 3D display. The view may be established by any suitable technique from the technical field of 3D image data visualization, such as a multi-planar reformatting (MPR) technique or a maximum intensity projection (MIP) technique.

The term spatial configuration of the set of planes refers to the orientations and/or positions of the respective planes in the 3D image data. The orientations and/or positions may be relative orientations and/or positions, e.g., expressed in relation to each other, or may be absolute, e.g., expressed in a coordinate system of the 3D image data.

The set of views being defined by the associated set of planes refers to the set of views being clearly characterized by said planes. For example, when a view is generated by the aforementioned MPR technique, i.e., corresponds to a slice, the associated plane may correspond to a slicing plane through the 3D image data. Moreover, when the view is generated by the aforementioned MIP technique, the associated plane may correspond to a projection plane through the 3D image data which is used in generating the view.

The term reference orientation refers to an orientation that the anatomical structure has in a reference view. The combination of reference orientation and reference view may be well-established in the medical domain, such as the pre-defined orientations of a body in the transverse, coronal and sagittal views, respectively.

The term anatomical orientation refers to an orientation that the anatomical structure currently has in the first view, i.e., as is displayed to the user. More aligning the anatomical orientation to the reference orientation refers to obtaining a better correspondence or match between the anatomical orientation and the reference orientation.

Figure 2A:
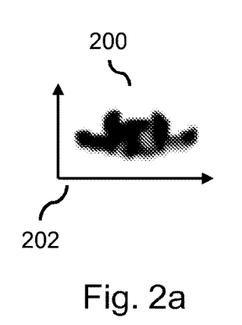
FIGS. 2a-c show reference orientations of a body.
Figure 2B:
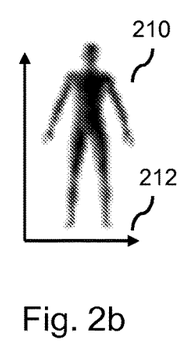
Figure 2C:
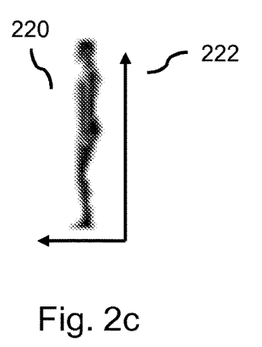

As an example of a reference view and a reference orientation, FIG. 2a shows a transverse view 200 schematically showing an intersection of the body through a transverse plane (not shown). The associated transverse orientation 202 is symbolically indicated by a combination of two arrows, denoting a direction parallel to the back of the body and an orthogonal direction. Similarly, FIG. 2b schematically shows a coronal view 210 of an intersection of the body through a coronal plane (not shown) and the associated coronal orientation 212. Lastly, FIG. 2c schematically shows a sagittal view 220 of an intersection of the body through a sagittal plane (not shown) and the associated sagittal orientation 222.

It will be appreciated that the above reference orientations, reference views and reference planes are examples, and depending on the type of 3D image data and/or the anatomical structure, many other possibilities exist. For example, when the anatomical structure is a heart, the reference view may be defined by, e.g., a vertical long axis plane, a two chamber view plane, a horizontal long axis plane, or a four chamber view plane, with an orientation of the heart being defined with respect to each of the reference views. In general, the invention can be applied any organ or anatomical sub-structure where there is a specific convention of a reference view and corresponding reference orientation of the particular organ or anatomical sub-structure, with the reference view being defined by a reference plane intersecting the particular organ or anatomical sub-structure.

Figure 3:
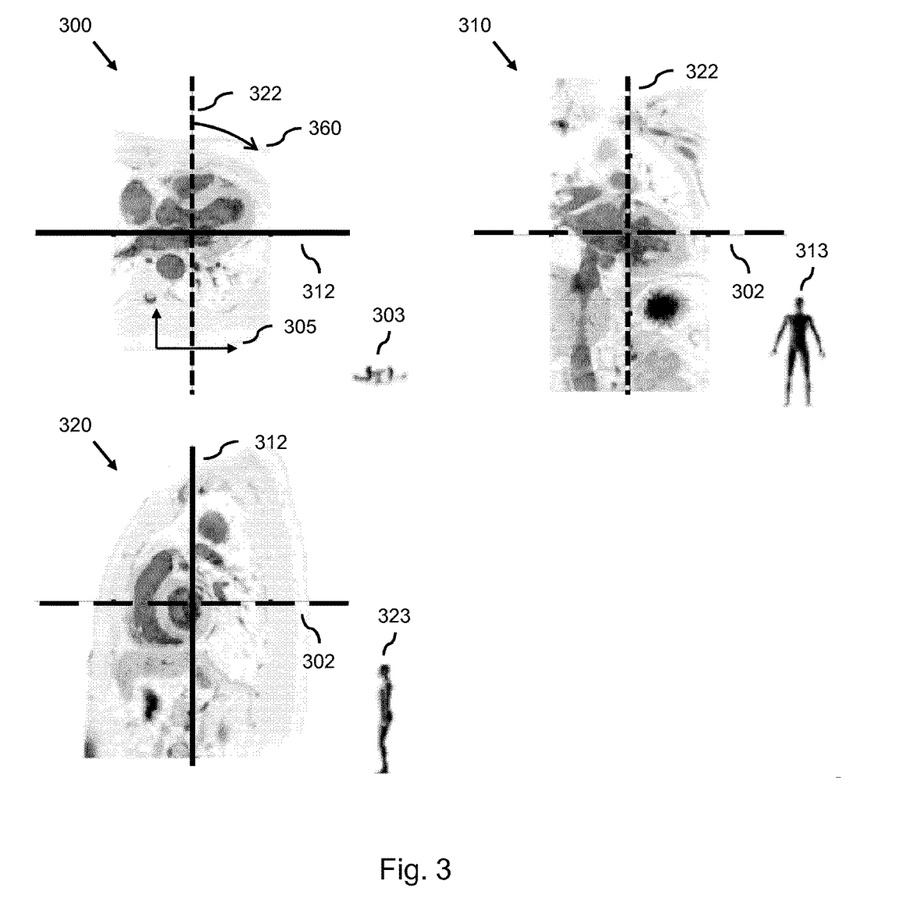
FIG. 3 shows a set of views and an associated set of planes.

During an operation of the medical image system 100, the medical image system 100 may simultaneously display a set of views of the 3D image data showing the anatomical structure. This is illustrated in FIG. 3, where the 3D image data shows a body of a patient, with the 3D image data being acquired by MRI. A first view 300, a second view 310 and a third view 320, together forming a set of views, correspond to slices through the 3D image data along a first plane, a second plane, and a third plane, respectively, with said planes together forming a set of planes intersecting the 3D image data.

For providing visual feedback to the user, each of the views in FIG. 3 visualizes the intersection lines of the respective associated plane with the remaining planes. For example, the first view 300 shows the intersections of the second plane 312 and the third plane 322 with the first plane 302, the latter running in parallel with the first view 300 and thus not being shown. Said intersections are shown as a solid line for the second plane 312 and as a dashed line for the third plane 322. Thus, the solid line, corresponding to the second plane 312, indicates to the user how the second view 310 is defined with respect to the first view 300, and the dashed line indicates to the user how the third view 320 is defined with respect to the first view 300. Similarly, the second view 310 shows the intersections with the first plane 302 and the third plane 322, and the third view 320 shows the intersections with the first plane 302 and the second plane 312. It will be appreciated that said visualization allows the user to visually obtain feedback on the spatial configuration of the set of planes and thus of the set of views. However, the medical image system may or may not provide said visualization, i.e., it is an optional element.

FIG. 3 further shows graphical representation 303, 313, 323 of the body being oriented in correspondence with the respective one of the set of views. For example, the graphical representation 303, as shown with the first view 300, shows the body from the feet, with the feet pointing upward. Thus, the graphical representation 303 indicates that the first view 300 is a transverse view. Similarly, the graphical representation 313, shown with the second view 310, indicates that the second view 310 is a coronal view, and the graphical representation 323, shown with the third view 320, indicates that that the third view 320 is a sagittal view. It will be appreciated that said graphical representations may or may not be displayed by the medical imaging system 100, i.e., are optional elements. Moreover, the orientation of the body in the first view 300 is symbolically indicated by a combination of two arrows, i.e., an orientation symbol 305, denoting a transverse orientation of the body.

The user may provide a navigation command by, e.g., dragging the dashed line of the third plane 322 in the first view 300 towards the right by operating, e.g., a mouse. The medical image system 100 may interpret the dragging action of the user as a request to rotate the third plane 322 around the intersection axis between the third plane 322 and the second plane 312, or around an intersection point between the third plane 322, the second plane 312 and the first plane 302. The rotation requested by the user is indicated in the first view 300 of FIG. 3 by a curved arrow 360. In response to the requested rotation, the plane processor 160 may then adjust the orientation of the third plane 322 in the 3D image data accordingly.

Figure 4:
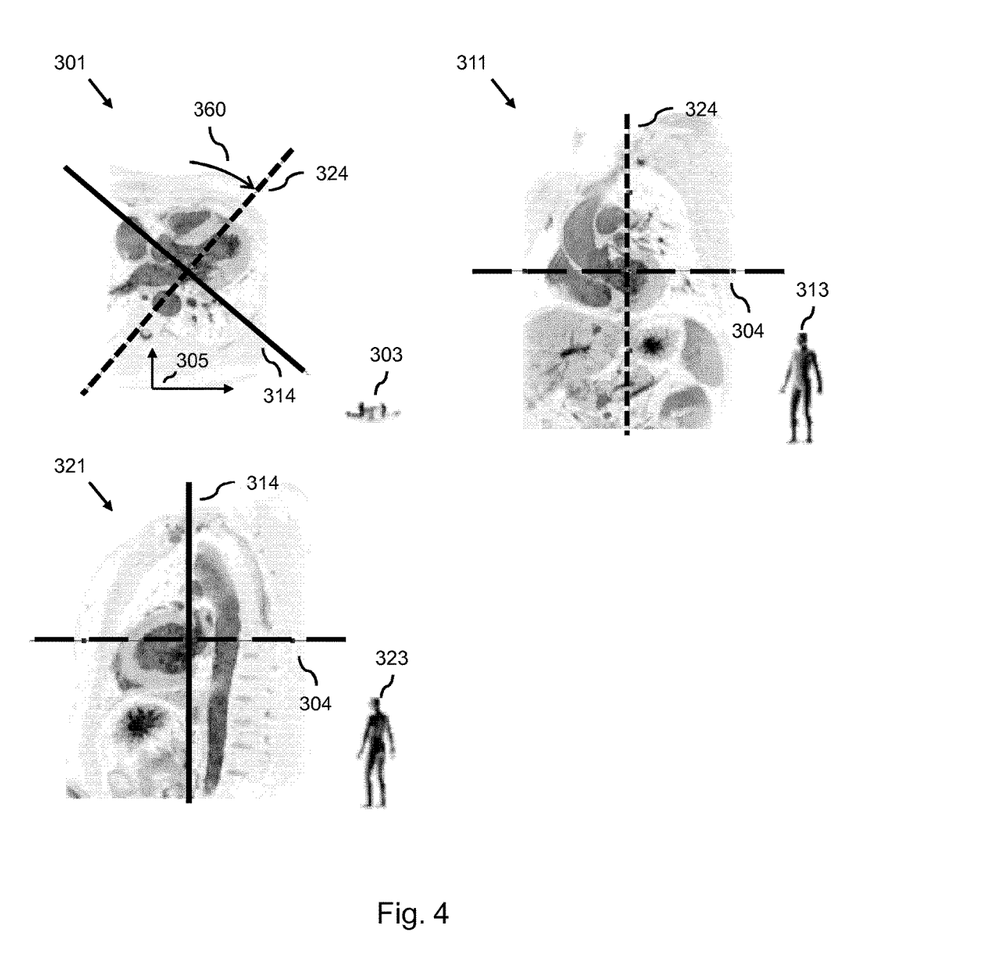
FIG. 4 shows a further set of views and an associated further set of planes established by the medical image system in response to a navigation command.

FIG. 4 shows a result of the plane processor 160 adjusting the orientation of the third plane 322 in the first view 300 of FIG. 3. The third plane 322 is rotated by an amount as indicated by the curved arrow 360, yielding a further third plane 324 as indicated by the dashed line in a further first view 301. Moreover, the third plane 322 and the second plane 312 are shown to be mutually orthogonal in FIG. 3. The plane processor 160 may configured for maintaining orthogonality, by, when the orientation of the third plane 322 is adjusted, adjusting the orientation of the second plane 312 accordingly. As a result, in FIG. 4, the second plane 312 is also rotated by the amount indicated by the curved arrow 360, yielding a further second plane 314 as indicated by the solid line. As a result, the further third plane 324 and the further second plane 314 are shown to be mutually orthogonal in FIG. 4. Also, the first plane 302 is shown to be orthogonal to the second plane 312 and the third plane 322 in FIG. 3. However, the rotation of the third plane 322 does not affect its orthogonality with respect to the first plane 302. As a result, the plane processor 160 does not need to adjust the orientation of the first plane 302, yielding an identical, non-adjusted further first plane 304.

Also shown in FIG. 4 are the results of the view processor 180 generating a further second view 311 and a further third view 321 in response to the plane processor 160 providing the further second plane 314 and the further third plane 324, respectively. It will be appreciated that the further second view 311 shows a differently oriented slice through the body than the second view 310 shown in FIG. 3. This is also indicated by the differences in orientation of the graphical representation of the body 313 between FIGS. 3 and 4. Similarly, the further third view 321 shows a differently oriented slice through the body than the third view 320 shown in FIG. 3. It will be appreciated, that in this particular example, the orientation of the first plane 302 is not adjusted, i.e., the further first plane 304 is identical to the first plane 302. As a result, the view processor 180 may provide the first view 300 as a further first view 301, yielding an identical, non-adjusted further first view 301.

It will be appreciated that the user may also adjust the first plane 302 by dragging, e.g., the coarsely dashed line in the third view 320 in FIG. 3. In this case, the view processor 180 may establish a further first view 301 that differs from the first view 300. Moreover, the plane processor 160 may be configured for not maintaining orthogonality. Consequently, when the plane processor 160 adjusts the orientation of the third plane 322, the orientation of the second plane 312 may not be adjusted accordingly. As a consequence, the further third plane 324 and the further second plane 314 may, although not shown in FIG. 4, be rotated towards each other, resulting in mutually oblique further planes. It is noted that the medical image system being configured for maintaining the orthogonality of the set of planes and of the set of views may be referred to as planar mode or ortho-viewer mode.

Figure 5:
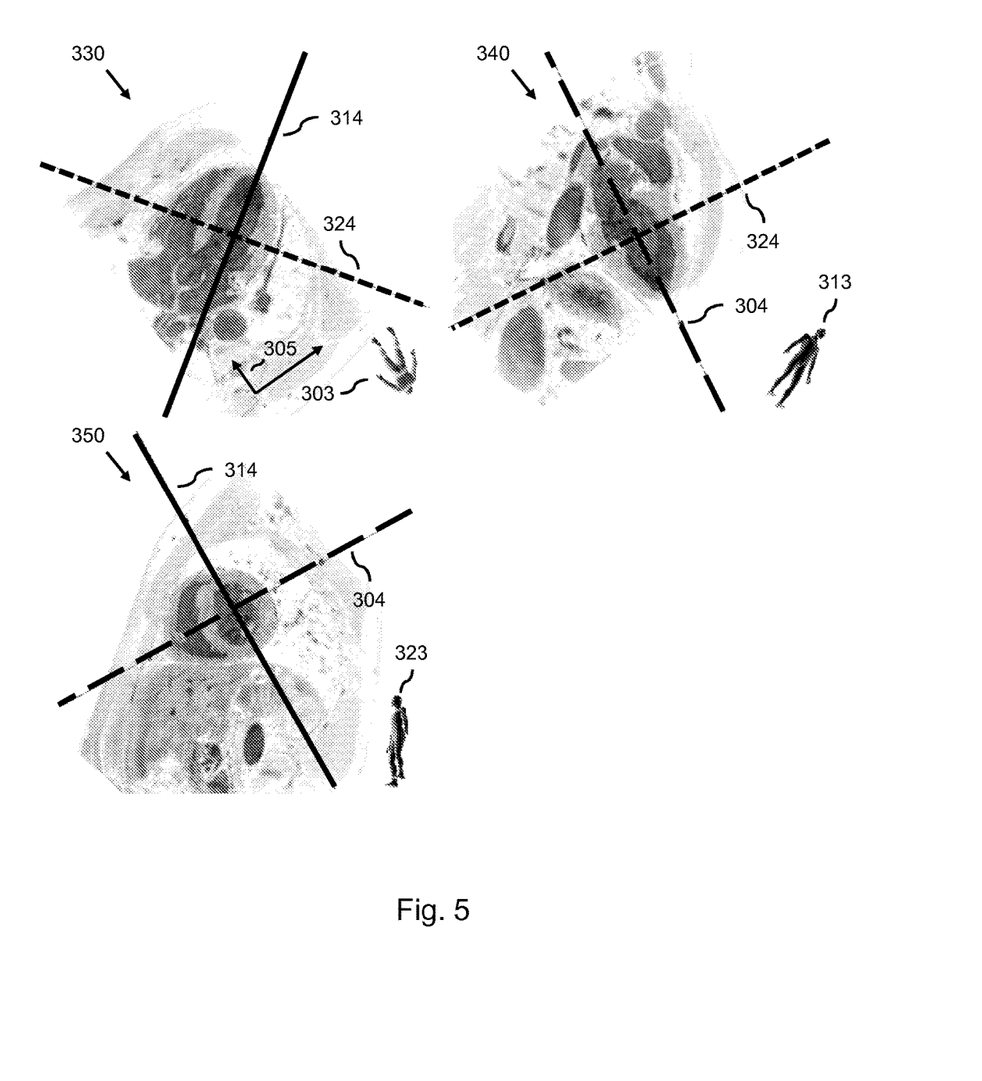
FIG. 5 shows the further set of views being a set of double oblique views.

FIG. 5 shows an example of a further set of views, i.e., a further first view 330, a further second view 340 and a further third view 350. The further set of views may correspond to a certain moment in time during the navigating through the 3D image data by the user. In this example, the associated further set of planes, i.e., the further first plane 304, the further second plane 314 and the further third plane 324, is shown to be a mutually orthogonal further set of planes. It will be appreciated, however, that the further set of planes may not need to be mutually orthogonal. Furthermore, the spatial configuration of the further set of planes is such that each of the planes is double oblique with respect to the set of planes shown in FIG. 3, i.e., the first plane 302, the second plane 312 and the third plane 322.

In the following, the set of planes of FIG. 3 may be considered as a set of reference planes, with the first plane 302 being a transverse plane, the second plane 312 being a coronal plane and the third plane 322 being a sagittal plane, the first view 300, second view 310 and third view 320 being associated reference views, and the transverse, coronal and sagittal orientations of the body being associated reference orientations.

It is noted that each of the planes of the further set of planes is double oblique with respect to the set of reference planes. This is also indicated by the differences in orientations of the respective graphical representations 303, 313, 323 of the body between FIG. 3 and FIG. 5. Moreover, the orientation of the body in the further first view 330 is schematically indicated by the orientation symbol 305, denoting a current orientation of the body. When comparing the orientation of the orientation symbol 305 between FIG. 3 and FIG. 5, it is clear that the orientation symbol 305 in FIG. 5 is rotated with respect to the orientation symbol 305 in FIG. 3. The orientation symbol 305 in FIG. 3 denotes a transverse orientation of the body. Consequently, the orientation of the body in FIG. 5 is rotated with respect to the transverse orientation of the body in FIG. 3. It will be appreciated that essentially, a clinician may still interpret the further first view 330 as a transverse view, even though the further first view 330 does not coincide with a transverse plane through the body. A reason for this may be that said view corresponds more to a transverse view than to a coronal or sagittal view.

Figure 6:
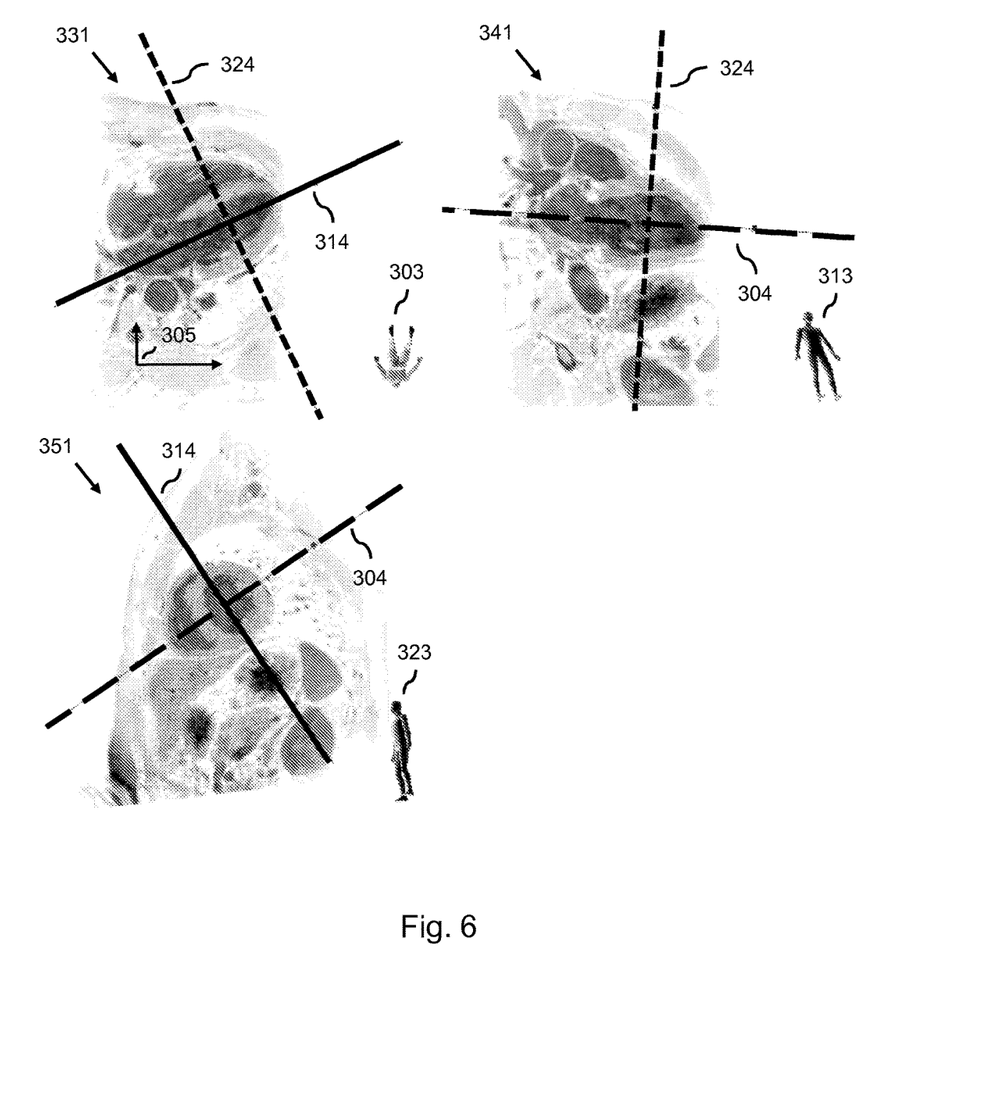
FIG. 6 shows the further set of views after performing in-plane rotation.

FIG. 6 shows a result of the view processor 180 adjusting a rotation of the further first view 330, i.e., performing an in-plane rotation of the further first view 330, resulting in a rotated further first view 331. Here, the orientation of the body is shown to be adjusted with respect to the orientation of the body in the further first view 330 of FIG. 5. The degree of rotation is such that the body essentially has a same orientation as the body in the first view 300 of FIG. 3, i.e., a transverse orientation in which the anterior side is oriented towards a top of the view and the left side of the body to the right side of the view. As a result, a posterior side of the body is shown in the rotated further first view 331 to run parallel to a horizontal axis of said view. When comparing the orientation of the orientation symbol 305 between FIG. 3 and FIG. 6, it is clear that the orientation symbol 305 in FIG. 6 has essentially the same orientation as the orientation symbol 305 in FIG. 3. Thus, the orientation symbol 305 indicates that the current orientation of the body in the rotated further first view 331 is essentially the same as in the first view 300 of FIG. 3. In this respect, it is noted that the orientation of the body being essentially the same does not refer to the rotated further first view 331 being a transverse view, but rather to the orientation of the body within the rotated further first view 331 corresponding to that of the body in a transverse view, i.e., the anterior side is oriented towards a top of the view and the left side of the body to the right side of the view, despite the rotated further first view 331 not fully corresponding to a transverse view.

FIG. 6 also shows the results of the view processor 180 adjusting a rotation of the further second view 340 and the further third view 350, resulting in a rotated further second view 341 and a rotated further third view 351. Furthermore, it will be appreciated that the medical image system 100 may be configured for displaying the rotated further set of views shown in FIG. 6, without previously displaying the further set of views of FIG. 5. Thus, the further set of views of FIG. 5 may be understood as depicting, for sake of explanation, a situation in which the view processor 180 does not adjust a rotation of the views.

The view processor 180 may be configured for adjusting the rotation of the further first view 330 by determining a spatial difference between, on the one hand, the further first plane 304, and on the other hand, the first plane 302 shown in FIG. 3. The first plane 302 is a transverse plane defining a transverse view, i.e., the first view 300 shown in FIG. 3, showing a transverse orientation of the body. The spatial difference may be determined by comparing an orientation and/or position of the first plane 302 and the further first plane 304. Comparing the orientation may comprise determining a first normal vector of the further first plane 304, determining a reference normal vector of the first plane 302, and comparing the first normal vector with the reference normal vector by calculating a difference between both normal vectors. It will be appreciated that determining the spatial difference may also comprise, e.g., determining a difference between plane equations of the first plane 302 and the further first plane 304.

The spatial difference may be used to adjust the rotation of the further first view 330 in the further first plane 304 by using principles from the field of Euclidian geometry. A reason for this is that the transverse orientation is geometrically associated with the first plane 302, i.e., the transverse plane, with the transverse orientation being available from the orientation data. Furthermore, the spatial difference geometrically associates the transverse plane with the further first plane 304. From this, it can be determined how the body is oriented in the further first view 330. Moreover, from the difference between the transverse orientation and said orientation of the body in the further first view 330, it can be determined how the further first view 330 needs to be rotated in order to more align the said orientation of the body with the transverse orientation. It will be appreciated that the view processor 180 may be configured for partially compensating for said difference in orientation, i.e., by more aligning both orientations, or for fully aligning said orientations. The latter is shown in FIG. 6.

A publication "*Automatic In-Plane Rotation for Doubly-Oblique Cardiac Imaging*", by Peter Kellman et al., Journal of Mag. Res. Imag., vol. 18, 2003, pp. 612-615 describes automatically calculating an in-plane rotation for doubly-oblique slice geometry in order to minimize wrap artifacts for a given field-of-view of the cardiac imaging. Thus, parameters of the cardiac imaging are adjusted to account for the in-plane rotation, thereby reducing so-termed wrapping artifacts in the images. Although the publication does not deal with performing an in-plane rotation when displaying views, the skilled person is referred to the mathematical teachings of the section "Description and Theory" for allowing the skilled person to adjust the rotation of the further first view in dependence on the spatial difference.

The view processor 180 may be arranged for mirroring the further first view 330 with respect to a mirror axis in the further first plane 304 for more aligning the orientation of the body with the transverse orientation. The mirror axis may correspond to any of the intersections of the further first plane 304 with the further second plane 314 or the further third plane 324. The mirror axis may also correspond to any other mirror axis that is not explicitly indicated in FIG. 5, e.g., an horizontal axis vertically dividing the further first view 330 or an vertical axis horizontally dividing the further first view 330.

It will be appreciated that in the above, instead of a transverse plane as reference plane, a transverse view as reference view and a transverse orientation as reference orientation, any other suitable reference plane, reference view and reference orientation may be chosen. For example, when the anatomical structure is a heart, the reference plane may be, e.g., a vertical long axis plane, the reference view may be a vertical long axis view, and the reference orientation may be a clinically established orientation of the heart in the vertical long axis view. Moreover, the reference plane may be defined by two coordinate axes of the 3D image data, e.g., when the two coordinate axes define a suitable intersection plane.

The orientation data 142 may be indicative of a plurality of reference orientations of the anatomical structure with respect to a plurality of reference planes intersecting the 3D image data. For example, the orientation data 142 may be indicative of a transverse orientation, a coronal orientation, a sagittal orientation and their associated plurality of reference views and reference planes. The view processor 180 may be arranged for determining a plurality of spatial differences between, on the one hand, the further first plane 304, and on the other hand, a respective one of the plurality of reference planes. The view processor 180 may then determine which of the plurality of reference views is most similar to the further first view 330 by determining which of the plurality of reference planes has the lowest spatial difference. Finally, the view processor 180 may adjust the rotation of the further first view 330 to more align the orientation of the body to the reference orientation associated with the most similar one of the plurality of reference views. For example, in FIG. 5, the view processor 180 may determine that the further first view 330 is most similar to a transverse view, and thus align the orientation of the body in the further first view 330 to a transverse orientation. Similarly, the view processor 180 may determine that the further second view 340 is most similar to a coronal view, and align the orientation of the body in the further second view 340 to a coronal orientation. Lastly, the view processor 180 may determine that the further third view 340 is most similar to a sagittal view, and align the orientation of the body in the further third view 340 to a sagittal orientation.

Figure 7:
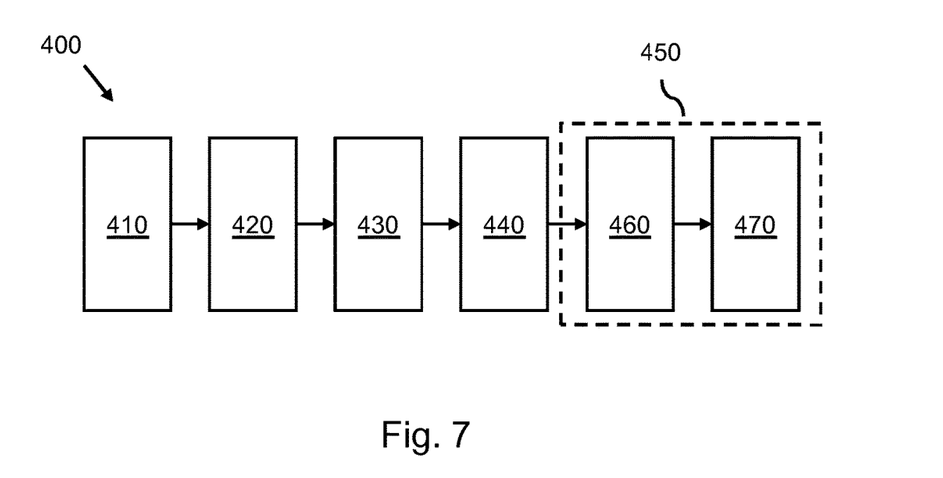
FIG. 7 shows a method according to the invention.

FIG. 7 shows a method 400 for enabling a user to navigate through three-dimensional [3D] image data showing an anatomical structure by simultaneously displaying a set of views of the 3D image data showing the anatomical structure, the set of views being defined by an associated set of respective planes intersecting the 3D image data, the set of planes having a spatial configuration in the 3D image data, and the method comprising receiving 410 orientation data being indicative of a reference orientation of the anatomical structure in a reference view, the reference view being defined by a reference plane intersecting the 3D image data, receiving 420 a navigation command from the user, adjusting 430, in dependence on the navigation command, the spatial configuration of the set of planes for obtaining a further set of planes intersecting the 3D image data, establishing 440, in dependence on the further set of planes, a further set of views of the 3D image data for displaying the further set of views as an update of the set of views, and establishing 450 at least a first view of the further set of views by (i) determining 460 a spatial difference between, on the one hand, a first plane of the further set of planes being associated with the first view, and on the other hand, the reference plane, and (ii) adjusting 470 a rotation of the first view in the first plane in dependence on the spatial difference for more aligning an anatomical orientation of the anatomical structure in the first view to the reference orientation in the reference view.

Figure 8:
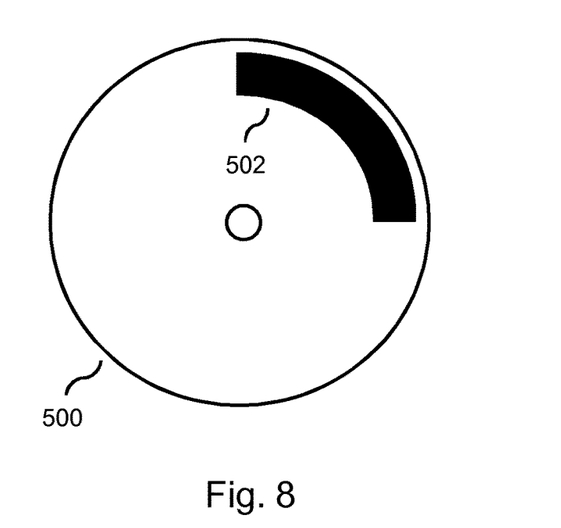
FIG. 8 shows a computer program product comprising instructions.

FIG. 8 shows a computer program product 500 comprising instructions 502 for causing a processor system to perform the method 400 as shown in FIG. 7. The instructions 502 may be embodied on the computer program product 500 as physical marks or by means of magnetization of the computer program product 500. However, any other suitable embodiment is conceivable as well. Furthermore, it will be appreciated that, although the computer program product 500 is shown in FIG. 8 as an optical disc, the computer program product 500 may be any suitable computer readable medium, such as a hard disk, solid state memory, flash memory, etc., and may be non-recordable or recordable.

In general, the view processor may be configured for rotating the first view such that, (i) when the first view is approximately a transverse view, that the horizontal image direction (i.e., right-left, RL) is in a non-angulated coronal plane, (ii) when the first view is approximately a sagittal view, the vertical image direction (feet-head, FH) is in a non-angulated coronal plane, and (iii) when the first view is approximately a coronal view, the vertical image direction (feet-head FH) is in a non-angulated sagittal plane. Moreover, when the first view is approximately a so-termed double angulated coronal view tending to sagittal, the first view is aligned as if the first view were a sagittal view, i.e., such that the vertical image direction (FH) is in a non-angulated coronal plane. However, different strategies for automatically calculation the in-plane orientation may also be used.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A medical image system for enabling a user to navigate through a three-dimensional (3D) image of an anatomical structure, the system comprising:
    a display configured to simultaneously display a set of three views of the 3D image defined by an associated set of three respective mutually orthogonal planes intersecting the 3D image wherein each view is associated with one of the three mutually orthogonal planes and displays the other two planes of the three mutually orthogonal planes as lines while the associated mutually orthogonal plane is not shown; and
    a computer programmed to:
    obtain a further set of three respective mutually orthogonal planes intersecting the 3D image corresponding to a spatial configuration indicated in a navigation command performed in one view of the three views and comprising dragging a line representing one of the two mutually orthogonal planes represented as a line to input a rotation of the plane represented by the dragged line around an intersection point between the plane represented by the dragged line and the other plane of the two mutually orthogonal planes represented by a line; and
    derive a further set of three views of the 3D image defined by the further set of three respective mutually orthogonal planes by:
        (i) determining a spatial difference between a first plane of the further set of three mutually orthogonal planes associated with a first view of the further set of three views and a reference plane of a reference view defined by the reference plane and having a reference anatomical orientation of the anatomical structure,
        (ii) adjusting a rotation of the first view in the first plane of the further set of three mutually orthogonal planes in dependence on the spatial difference for more closely aligning an anatomical orientation of the anatomical structure in the first view of the further set of three views to the reference anatomical orientation in the reference view; and
        (iii) adjusting the second view and the third view of the further set of three views in dependence on the adjusted rotation of the first view of the further set of three views.

2. The medical image system according to claim 1, wherein the rotation of the first view in the first plane of the further set of three planes is adjusted to fully align the anatomical orientation of the anatomical structure to the reference anatomical orientation.

3. The medical image system according to claim 1, wherein the computer is further programmed to mirror the first view in the first plane of the further set of three planes with respect to a mirror axis in the first plane of the further set of three planes for said more closely aligning the anatomical orientation of the anatomical structure in the first view of the further set of three views with the reference anatomical orientation.

4. The medical image system according to claim 1, wherein the reference plane is defined by two coordinate axes of the 3D image.

5. The medical image system according to claim 1, wherein the anatomical structure is a body of a patient, and the reference plane is selected from one of a transverse plane, a coronal plane, and a sagittal plane, intersecting the body.

6. The medical image system according to claim 5, wherein the reference orientation is selected from one of a transverse orientation, a coronal orientation, and a sagittal orientation, of the body.

7. The medical image system according to claim 1, wherein the anatomical structure is a heart, and wherein the reference plane is selected from one of a vertical long axis plane, a two chamber view plane, a horizontal long axis plane, and a four chamber view plane, intersecting the heart.

8. The medical image system of claim 1 wherein the computer is programmed to determine the spatial difference between the first plane of the further set of three planes and the reference plane by operations comprising:
   (i) determining a normal vector of the first plane of the further set of three planes,
   (ii) determining a reference normal vector of the reference plane, and
   (iii) comparing the normal vector with the reference normal vector.

9. The medical image system according to claim 1, wherein the computer is further programmed to select the first plane of the further set of three planes as the plane of the further set of three planes having the smallest spatial difference between the plane of the further set of three planes and the reference plane.

10. The image system according to claim 1, wherein the system comprises one of a workstation and an imaging apparatus.

11. A method for enabling a user to navigate through three-dimensional (3D) image showing an anatomical structure, the method comprising:
   on a display device, simultaneously displaying at least one reference view of a set of reference views of the 3D image, the set of reference views being defined by a corresponding set of reference planes intersecting the 3D image, each reference view having a corresponding reference orientation of the anatomical structure;
   with one or more processors, obtaining a further set of planes intersecting the 3D image corresponding to a spatial configuration indicated in a navigation command; and
   with the one or more processors, deriving a further set of views of the 3D image defined by the further set of planes by:
      (i) determining a spatial difference between a first plane of the further set of planes associated with a first view of the further set of views and a selected reference plane of the set of reference planes,
      (ii) adjusting a rotation of the first view in the first plane in dependence on the spatial difference for more closely aligning an anatomical orientation of the anatomical structure in the first view to the reference orientation of the anatomical structure in the selected reference view, and
      (iii) adjusting the other views of the further set of views in dependence on the adjusted rotation of the first view of the further set of view.

12. A non-transitory computer-readable medium carrying instructions for causing a processor system to perform the method according to claim 11.

13. The medical image system of claim 1 wherein the reference view is a transverse view defined by a transverse reference plane and the reference anatomical orientation comprises the horizontal image direction being a non-angulated coronal plane.

14. The medical image system of claim 1 wherein the reference view is a sagittal view defined by a sagittal reference plane and the reference anatomical orientation comprises the vertical image direction being a non-angulated coronal plane.

15. The medical image system of claim 1 wherein the reference view is a coronal view defined by a reference coronal plane and the reference anatomical orientation comprises the vertical image direction being a non-angulated sagittal plane.

* * * * *